D. M. DAVIS.
Wheel-Cultivator.
No. 43,901. Patented Aug. 23, 1864.
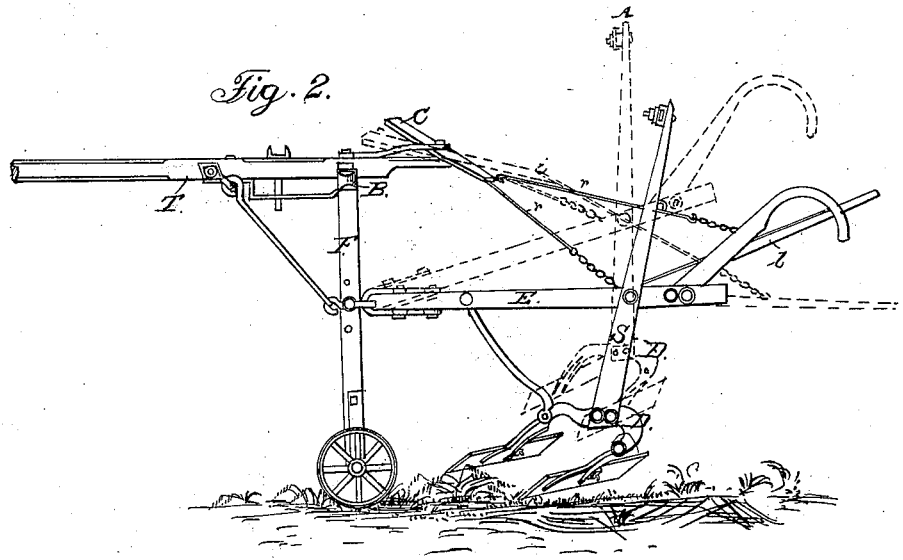
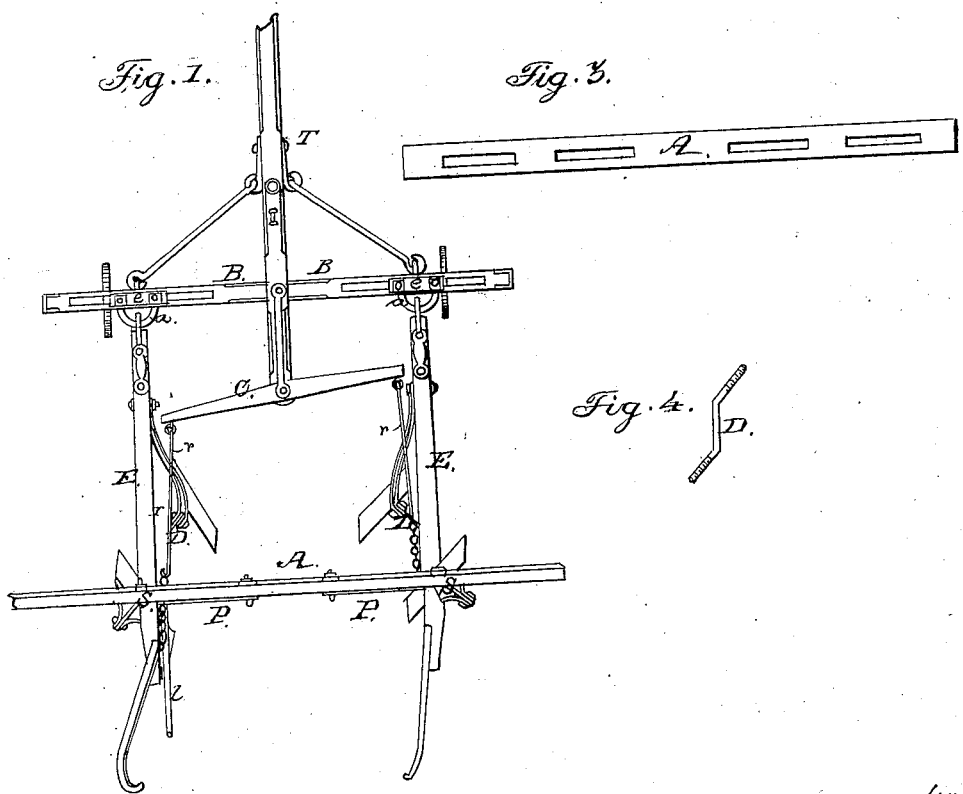
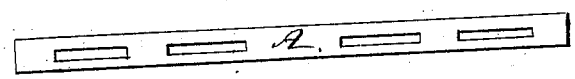
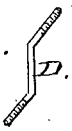
WITNESSES:
Lewis L. Coburn
James Clark
INVENTOR
D. M. Davis
N. PETERS, PHOTO-LITHOGRAPHER, WASHINGTON, D. C.

UNITED STATES PATENT OFFICE.

D. M. DAVIS, OF ASBURY, ILLINOIS, ASSIGNOR TO HIMSELF AND W. L. F. JONES, OF SAME PLACE.

IMPROVEMENT IN CULTIVATORS.

Specification forming part of Letters Patent No. 43,901, dated August 23, 1864.

*To all whom it may concern:*

Be it known that I, D. M. DAVIS, of Asbury, in the county of La Salle and State of Illinois, have invented a new and useful Improvement in Cultivators; and I do hereby declare that the following is a full and exact description of the same, reference being had to the accompanying drawings and the letters of reference marked thereon.

The nature of my invention consists in so constructing a cultivator that by a simple adjustment of the plows the soil can be thrown either to or from the plant, and also the depth which the plows run in the soil can be readily gaged. The space between the two sets of plows—which run, when in use, one on each side of a row—can be varied to adapt it to the different widths of space between the rows, and the plows can be thrown entirely from the soil to be driven to and from the field.

To enable others skilled in the art to make and use my invention, I will proceed to describe its construction and operation.

Figure 1 represents a top view of my improved cultivator; Fig. 2, a side view of the same. Fig. 3 is a side view of the cross-piece A.

T, the tongue of the cultivator, is firmly attached to the front cross-piece, B, and extends back to support the vibrating lever C. The two uprights F are supported upon wheels, and are attached to B by means of strips of metal, which are fastened to the sides of F and extend up through the slots in B and the plates *e e*, and are tightened by means of screw-nuts, as shown in Fig. 1.

To the uprights F F the plow-beams E E are attached by means of clevises, as shown at *a a*, and they can be moved up or down on the uprights to regulate the depth of the plows in the soil. Fastened firmly to each of these beams is the plow-standard S, as more plainly shown in Fig. 2, the tops of which are fastened to the cross-piece A, and for the purpose of strength the braces *d d* are used, extending from the plow-beams to the cross-piece A. They are all fastened to the cross-piece A by means of bolts and nuts, or in some way so that they can be readily loosened for removal.

*l* is a lever, with one end attached to the plow-beam E in such a manner as to allow it to turn vertically. Near the center of said lever the rod *r* is attached, which is also hooked to one end of the vibrating lever C. To the other end of C the rod *r* is hooked, which connects with the other plow-beam E. The connecting-piece D is bent both vertically, as shown in Fig. 2, and has two lateral angles of about forty-five degrees each, as shown in Fig. 4, which gives a convenient shape to be attached to the plow-standard S, and gives both plow-blades the same relative angles to the direction of the line of draft, and places the rear blade so that it commences to cut the soil just where the front blade leaves it uncut. The plow-blades also have the same relative positions to each other and the same angles to the line of draft when the two sides of the cultivator are changed places, so as to throw the soil from the row instead of to it.

To regulate the depth of the plows in the soil, the attachments of the plow-beams E E to the standards F F are raised or lowered in the holes shown in Fig. 2. To throw the soil from the row, instead of to it, the clevises *a a* are unfastened, the rods *r r'* unhooked, the nuts *y y y y* loosened, and the two sides of the cultivator simply changed places. To regulate the width of space between the plows to adapt them to the space between the rows, the nuts that fasten the standards F F and S S to the cross-pieces B and A are loosened, and the standards on each side are moved to or from each other in the slots shown in the cross-pieces A and B. To raise the plow-blades from the soil to a suitable position for driving the cultivator to or from the field, the lever *l* is thrown down and hooked to the inside of the beam E, which throws the cultivator into the position shown by the red lines in Fig. 2.

Having thus fully described the construction and operation of my improved cultivator, what I claim as my invention, and desire to secure by Letters Patent, is—

The combination and arrangement of the lever *l*, the rod *r*, the vibrating lever C, the rod *r'*, and the plow-beam E, when constructed and operating substantially as herein delineated and described.

D. M. DAVIS.

Witnesses:
LEWIS L. COBURN,
W. E. MARRS.